United States Patent [19]
Kusano et al.

[11] Patent Number: 5,466,424
[45] Date of Patent: Nov. 14, 1995

[54] CORONA DISCHARGE SURFACE TREATING METHOD

[75] Inventors: Yukihiro Kusano, Kokubunji; Tomoko Inagaki; Masato Yoshikawa, both of Kodaira; Setsuo Akiyama, Sagamihara; Kazuo Naitoh, Kawasaki, all of Japan

[73] Assignees: Bridgestone Corporation; Bridgestone Sports Co., Ltd., Tokyo, Japan

[21] Appl. No.: 174,436

[22] Filed: Dec. 28, 1993

[30] Foreign Application Priority Data

Dec. 28, 1992 [JP] Japan .................................. 4-361089

[51] Int. Cl.$^6$ .............................. B01J 19/08; B05D 3/06
[52] U.S. Cl. ................... 422/186.05; 427/569; 427/536; 427/539; 427/322; 273/230
[58] Field of Search .................................. 427/509, 536, 427/539, 322; 422/186.05; 273/230

[56] References Cited

U.S. PATENT DOCUMENTS

| | | | |
|---|---|---|---|
| 4,361,596 | 11/1982 | Dukhovskoi et al. | 427/536 |
| 4,649,097 | 3/1987 | Tsukada et al. | 430/270 |
| 4,871,589 | 10/1989 | Kitaoh et al. | 427/322 |
| 4,940,521 | 7/1990 | Dinter et al. | 427/569 |
| 5,041,304 | 8/1991 | Kusano et al. | 427/569 |
| 5,143,748 | 9/1992 | Ishikawa et al. | 427/569 |
| 5,194,291 | 3/1993 | D'Aloust et al. | 427/569 |
| 5,316,739 | 5/1994 | Yoshikawa et al. | 422/186.05 |

FOREIGN PATENT DOCUMENTS

| | | |
|---|---|---|
| 008414 | 11/1970 | Canada . |
| 0274938 | 7/1988 | European Pat. Off. . |
| 0287413 | 10/1988 | European Pat. Off. . |
| 0311198 | 4/1989 | European Pat. Off. . |
| 0386642 | 9/1990 | European Pat. Off. . |
| 1345151 | 1/1974 | United Kingdom . |

OTHER PUBLICATIONS

Fish, "Organic Polymer Coatings" from 'Deposition Technologies for Films and Coatings' by Bunshah et al., Noyes Publications, pp. 490 and 507–508.

*Primary Examiner*—Roy V. King
*Attorney, Agent, or Firm*—Sughrue, Mion, Zinn, Macpeak & Seas

[57] ABSTRACT

A surface treating method is described, which method comprising applying, between electrodes, a potential sufficient to cause corona discharge to occur in the presence of a gas which comprises molecules containing at least one atom selected from the group consisting of halogen atom, oxygen atom and nitrogen atom. The resultant corona discharge is applied to an object to be treated for the surface treatment of the object, said object being outside said electrodes. The excellent adhesive surface can be obtained when said object is separated from said electrodes at a distance in the range of 10 mm to 5 m.

21 Claims, 5 Drawing Sheets

CORONA DISCHARGE SURFACE TREATING METHOD

BACKGROUND OF THE INVENTION

1. Field of the Invention

This invention relates to a surface treating method wherein various types of materials can be surface-treated with a stream of corona discharge to impart hydrophilic properties or functional groups to the material or to subject the material to a kind of coating or etching.

2. Description of the Prior Art

Several methods for surface modification or surface treatment are known in the art wherein the surface of substrate materials is treated so as to impart thereto hydrophilic properties, water repellence and adhesiveness. For instance, the surface treatment of vulcanized rubber has been adopted for making composite materials by bonding the resultant vulcanized rubber with rubber materials or other materials such as metals, resins and the like or for pretreatments for coating of the vulcanized rubber. For this purpose, there are known many surface treating techniques.

Among the surface treating methods of vulcanized rubber, there is known a method of imparting adhesiveness to vulcanized rubber wherein the surface of vulcanized rubbers is strongly oxidized with strong acids or strong oxidizing agents, thereby causing the entire surface to be finely cracked. However, this method has the problem that care should be fully taken in handling the strong acids or oxidizing agents and that the vulcanized rubber surface is considerably impeded by the action of the strong acid or oxidizing agent, with the bonding force being not always satisfactory.

Moreover, there have been proposed surface treating methods including a method in which vulcanized rubber is exposed to chlorine gas or is immersed in water through which chlorine gas has been passed, or a method using pseudo-halogen compounds (Japanese Patent Publication No. 52-36910). In all of these methods, the rubber is attacked at double bonds thereof to incorporate Cl atoms instead, thereby forming a modified surface which is susceptible to bonding. Where vulcanized rubbers are surface treated according to these methods, the treated surface is converted into a kind of resin, for example, at the time of fabricating a rubber vibration insulator by using the rubber such as NR/SBR rubber in combination with other materials such as metals or resins. Thus, there arises the problem that the adhesiveness and heat resistance become deteriorated, coupled with another problem that the treated surface undesirably suffers yellowing. Moreover, if the above methods are applied to fabrication of golf balls wherein a vulcanized rubber made primarily of a balata material (or transpolyisoprene) is used to make a golf ball cover and the ball cover is subjected to the surface treatment and coated, the resultant ball becomes poor in appearance. The use of chlorine gas or pseudo-halogen compounds will cause an ecological problem.

Another surface treating method includes the one wherein a gas such as $O_2$ or a mixed gas such as $CF_4$ and $O_2$ is used for activating the surface of vulcanized rubber by etching according to a low pressure glow plasma treatment. Although the low pressure glow plasma treatment ensures a uniform surface treatment, with a reduced degree of unevenness of the treatment, it is necessary to effect the low pressure plasma treatment ordinarily at a pressure as low as not higher than 10 Torr. When the treatment is carried out on the industrial scale, a large vacuum apparatus is essential. During the course of evacuation to reduced pressure, oils and water will be released from the vulcanized rubber surface, with the possibility that intended performance and function are not obtained by the plasma treatment. In addition, the plasma treatment has another problem that heat is liable to generate during the treatment, so that application of the treatment to materials made of low melting substances is difficult.

Like the above low pressure glow plasma methods, corona discharge methods which have been put into practice are not satisfactory in their treating effect.

To solve the problems of the prior art methods or techniques, we have already proposed in Japanese Laid-open Patent Application No. 3-23183 a method wherein the vulcanized rubber surface is subjected to atmospheric pressure plasma treatment using a gas which consists of molecules Containing a halogen atom or an oxygen atom. In the case, the surface treatment can be performed simply in a clean environment since any solvent is not used. The resultant vulcanized rubber has an adhesive surface which is better than those surfaces obtained by prior art methods using, for example, a low pressure glow plasma treatment. In addition, since the treatment is limited only to the surface layer, the physical properties of the vulcanized rubber per se are not impeded.

In the atmospheric pressure plasma method, however, it is preferred to dilute a gas for treating a rubber with a diluent gas in order to stabilize the discharge. To this end, it will be necessary to use expensive gases such as helium gas in large quantities. The impedance at the time of the discharge is lower than that of corona discharge but is higher than in the case of low pressure plasma. This makes it difficult to use general-purpose corona power supply or low pressure plasma power supply as it is. A specific type of power supply for the atmospheric pressure plasma is required in most cases, leading to the problem of the rise in treating costs.

SUMMARY OF THE INVENTION

It is accordingly an object of the present invention to provide a method for surface treating various types of materials in an efficient manner with a good quality of the treated surface.

It is another object of the present invention to provide a method for surface treating vulcanized rubber materials to modify the surface properties thereof.

It is a further object of the present invention to provide a method for surface treating vulcanized rubber materials without involving any substantial change in quality of the rubber material.

It is a further object of the invention to provide a method for surface treating a golf ball cover made of a vulcanized rubber prior to coating on the surface thereof whereby the ball surface (cover) is modified and coated, with a good appearance and without degradation of the ball quality.

The above objects can be achieved, according to the invention, by a surface treating method which comprises applying, between electrodes, a potential sufficient to cause corona discharge to occur in the presence of a gas which comprises molecules containing at least one atom selected from the group consisting of halogen atom, oxygen atom and nitrogen atom, and subjecting an object to be treated to surface treatment with the resulting gas generated by the discharge. Preferably, the object to be treated is placed in a spaced relation with or at a position kept away from the electrodes.

The invention is based on the following finding. Corona discharge is initially caused to occur by application of a potential sufficient for the discharge between electrodes in an atmosphere of a gas which consists essentially of molecules containing at least a halogen atom, an oxygen atom or a nitrogen gas. When the surface of an object to be treated is treated with the resultant gas generated by the discharge, the surface treatment can be simply effected under clean environmental conditions without use of any solvent. In addition, the surface treatment of various types of materials can be performed in a manner more efficiently than with known low pressure plasma treatments. The results of the surface treatment are comparable to those attained by the atmospheric pressure plasma method. Nevertheless, expensive diluent gases such as helium as is essential in the atmospheric pressure plasma method are not necessary at all. In addition, general-purpose, inexpensive corona power supplies can be used as they are. By the above corona discharge treatment, only a surface skin layer is treated and thus, the physical properties inherent to the material to be treated are not impeded. The corona discharge unit including the electrodes and the object to be treated may be separated from each other at a distance of about 10 mm or over, under which the surface treatment proceeds in a satisfactory manner. The separation between the corona discharge unit and the object places little limitation on the shape and size of the object. If the object is not placed between the electrodes, corona discharge is not influenced at all. Limitations on the discharge conditions are not appreciable, so that the surface treatment is caused to proceed efficiently.

DETAILED DESCRIPTION OF PREFERRED EMBODIMENTS

Figure 1:
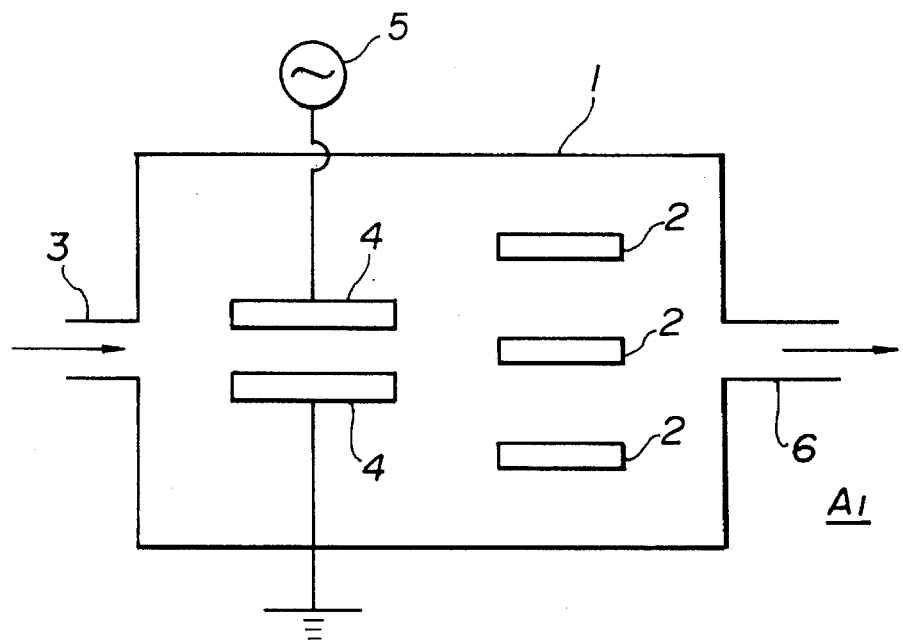
FIG. 1 is a schematic view showing one embodiment of a corona discharge device for carrying out the method of the invention.

According to the method of the invention, corona discharge is caused to occur by application of a potential necessary for the discharge between electrodes in an atmosphere of a gas which consists essentially of molecules containing, at least, a halogen atom, oxygen atom or nitrogen atom, and an object to be surface treated is subjected to exposure to the gas generated by the discharge. Preferably, the exposure is performed such that the object is surface treated while separating from the electrodes at a given distance.

The materials of the objects to be surface treated according to the method of the invention are first described. Such materials include, for example, vulcanized rubbers, synthetic resins such as polyethylene terephthalate (PET), polytetrafluoroethylene (PTFE), ethylene tetrafluoride-ethylene copolymers (ETFE), polyamides (nylons), and metals and alloys such as iron, copper, stainless steels, aluminum, brass and the like. Examples of vulcanized rubbers include vulcanized products of natural rubbers (NR), styrene-butadiene rubbers (SBR), isoprene rubbers (IR), acrylonitrile-butadiene rubbers (NBR), ethylene-propylene rubbers (EPM), ethylene-propylene-diene rubbers (EPDM), butadiene rubbers (BR), butyl rubbers (IIR), chloroprene rubbers (CR) and blends thereof. The object may take any forms such as plates, sheets, spheres, hollow cylinders, cylinders, blocks and the like.

The reactant gases used for the surface treatment according to the invention should be ones which comprises or consist essentially of molecules containing at least one of halogen, oxygen and nitrogen atoms. It is preferred to use a gas comprising or consisting essentially of molecules containing a halogen atom or atoms, or its mixture with a gas or gases each comprising or consisting essentially of molecules containing an oxygen and/or nitrogen atom. By this, the method of the invention can be more conveniently carried out.

Examples of the gas comprising or consisting of molecules containing an oxygen atom or atoms include gases such as air, $O_2$, $H_2O$, $CO_2$ and the like, and oxygen-containing organic gases such as alcohols, ketones, ethers and the like. Of these, air and $O_2$ are preferred.

Examples of the gas comprising or consisting essentially of molecules nitrogen atom-containing molecules include air and $N_2$.

Examples of the gas comprising or consisting essentially of halogen atom-containing molecules include simple gases such as $F_2$, $Cl_2$, $Br_2$, $I_2$ and the like, hydrogen halides such as HF, HCl, HBr and HI, flons such as $CF_4$, $CHClF_2$, $CClF_3$, $CCl_2F_2$, $C_2F_6$ and the like, halons such as $CBrF_3$, halogenated hydrocarbons such as $CHCl_3$, $CH_2Cl_2$, $CH_3CCl_3$, $CCl_4$ and the like, and $SF_6$ and $NF_3$. In view of the ease in handling, the flons, halons and halogenated hydrocarbons are preferred. In view of the ease in handling, preferably combinations with gases comprising or consisting of oxygen-containing molecules are mentioned below, of which the combinations where $O_2$ are replaced by air are more preferred. The combinations include $O_2+CCl_2F_2$, $O_2+CClF_3$, $O_2+CHClF_2$, $O_2+CBrF_3$, $O_2+CF_4$, $O_2+CF_4+CHCl_3$, $O_2+CF_4+CH_2Cl_2$, $O_2+CF_4+CCl_4$, $O_2+CF_4+CH_3CCl_3$ and the like.

Where the surface treatment is carried out using the above-indicated reactant gas, it is preferred to dilute the reactant gas with other gases. Examples of other gases include hydrogen, argon, various organic gases, and mixtures thereof.

These gases may not always-be gaseous at normal temperatures. The manner of supplying the gas is selected depending on the temperature of the discharge region and the state of a starting reactant at normal temperatures (i.e., solid, liquid or gas). If a starting reactant is gaseous at the temperature of the discharge region or at normal temperatures, it is passed into a treating vessel as it is. With liquids, if they have a relatively high vapor pressure, the vapor may be passed into the vessel as it is, or the liquid may be passed while bubbling with inert gases or may be used by application onto the surface of an object to the treated. On the other hand, when a starting reactant is not gaseous and is relatively low in vapor pressure, it is used after heating to make a gas or a high vapor pressure state.

In the present invention, the surface treatment is conducted at a pressure (absolute pressure) of 300 to 4000 Torr, preferably 700 to 1000 Torr, more preferably 740 to 800 Torr. The treating temperature is not limited, although it usually ranges from 0° C. to 80° C., preferably from 10° C. to 50° C. In general, the treatment is conducted in room temperature.

The materials of a treating chamber or chambers used for carrying out the surface treating method of the invention are not critical and include, for example, metals such as stainless steels, aluminum and the like, and insulators such as plastics, glass, ceramics and the like. The type of treating chamber is not critical provided that corona discharge is feasible in the chamber and that the chamber has a capacity sufficient to accommodate therein electrodes and an object or objects to be treated. In other words, the vessel is not limited with respect to the size and shape.

The corona discharge may be generated by any known procedures according to the invention. The application of a potential to electrodes may be broadly divided into two groups using DC and AC voltages. Industrially, AC discharge is easier and thus preferable.

Where AC discharge from internal electrodes is adopted, it is recommended to cover at least one of the electrodes with an insulator so as to ensure stable discharge. It will be noted that since corrosive gases may be generated by the discharge, it is preferred to cover both electrodes with an insulator in order to suppress corrosion of the electrode material. The insulating material used for this purpose may be those which are known in the art. Specific and preferred examples include ceramics such as mica, alumina, artificial synthetic mica and the like, and plastics such as silicone rubbers, fluorine resins and the like, which have high breakdown voltages.

On the other hand, with DC discharge, DC corona is formed owing to the direct inflow of electrons from the electrode, so that neither an electrode provided at a high voltage application side or an electrode at the side of ground is covered with an insulator. In either DC or AC discharge, the materials for the electrodes may not be critical provided that they have high electric conductivity.

Figure 2:
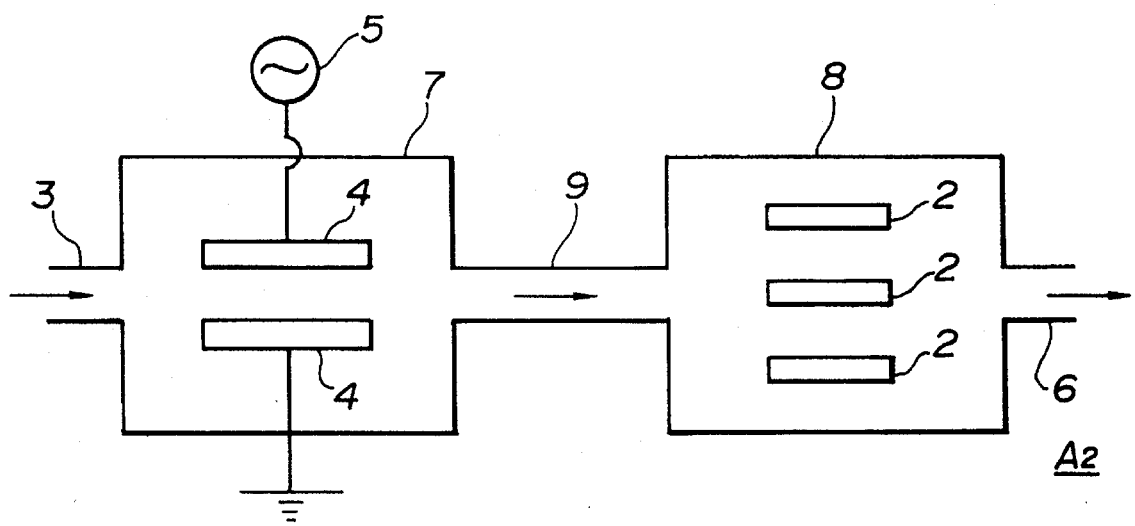
FIG. 2 is a schematic view showing another embodiment of a corona discharge device for carrying out the method of the invention.
Figure 3:
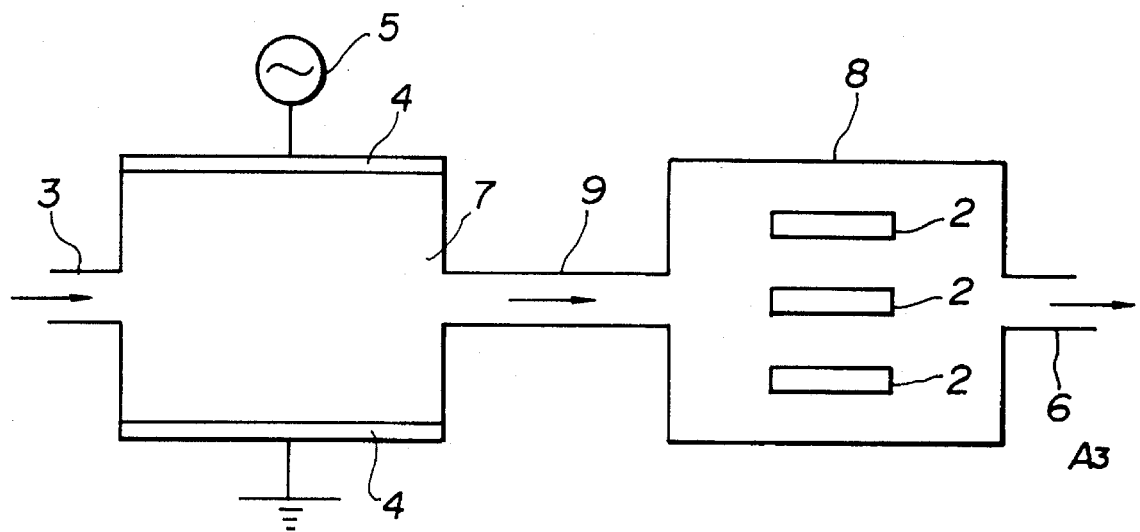
FIG. 3 is a schematic view showing a further embodiment of a corona discharge device for carrying out the method of the invention.

Corona discharge apparatus used to carry out the surface treatment according to the invention may be ones wherein an object or objects to be treated are provided between an applied electrode and a ground electrode. Preferably, such apparatus as shown in FIGS. 1 to 3 are mentioned. In the figures, like reference numerals, respectively, indicate like parts or members.

FIG. 1 shows a corona discharge apparatus A1 which includes a treating chamber 1 wherein a corona discharge region is formed. The chamber 1 has a plurality of objects 2 to be treated accommodated therein. The chamber 1 has a gas feeder pipe 3 at one side thereof through which a gas comprising or consisting of molecules containing at least one halogen atom, oxygen atom or nitrogen atom is passed with or without a diluent gas therefor, and a gas discharge pipe 6 at the other side of the chamber. The chamber 1 also has electrodes 4, 4 spaced apart from each other at a given distance as shown. These electrodes 4, 4 are each covered with an insulator (not shown) and one of the electrodes is connected to an AC power supply 5. The other electrode is connected to ground. In this case, the objects 2 are kept away from the electrodes 4, 4 and are surface treated when corona discharge takes place.

It is preferred that when the object or objects 2 are separated from the electrodes 4, 4, the distance therebetween is in the range from 10 mm to several tens meters, preferably 10 mm to 5 m, more preferably 10 mm to 2 m.

FIG. 2 shows another corona discharge apparatus A2 in which the treating chamber 1 of FIG. 1 is separated into a discharge chamber 7 and a treating chamber 8. A gas generated by corona discharge in the chamber 7 is introduced through a pipe 9 into the chamber 8 wherein the objects 2 are surface treated. In this case, the distance between the electrodes 4, 4 and the objects 2 is preferably in the above-indicated range.

FIG. 3 shows a further corona discharge apparatus A3 wherein the electrodes 4, 4 are, respectively, provided to constitute upper and lower sides of the chamber 7. In this case, the electrodes 4, 4 should preferably be cooled, and the surface treatment of the objects 2 is carried out in the same manner as with the apparatus of FIG. 2.

Figure 4:
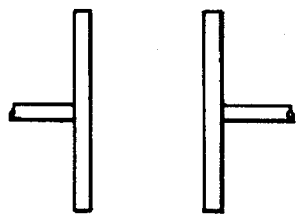
FIG. 4 is a schematic view of a pair of electrodes used in examples of the invention.
Figure 5:
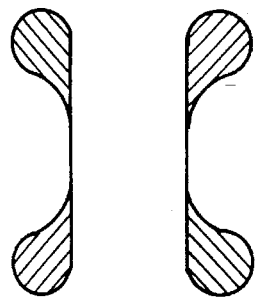
FIGS. 5, 6, 7, 8, 9, 10 and 11 are, respectively, schematic views of other types of electrodes used in combination.
Figure 6:
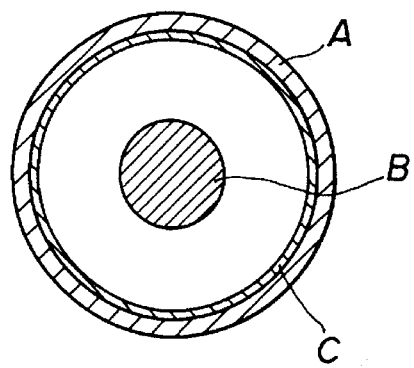
Figure 7:
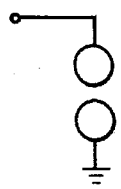
Figure 8:
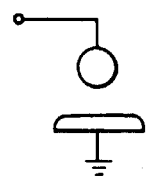
Figure 9:
Figure 10:
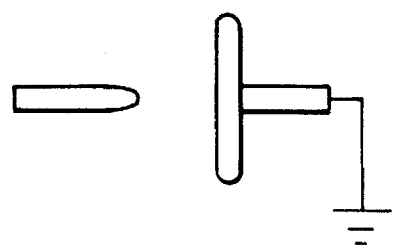
Figure 11:
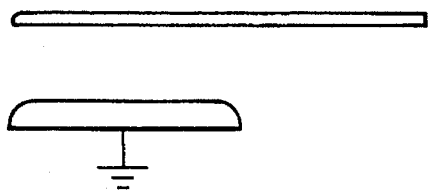

The electrodes 4, 4 may take any form provided that corona discharge is possible. For instance, there are used electrodes of the forms shown in FIGS. 4 to 11. More particularly, there are shown parallel plate electrodes in FIG. 4, approximate Rogouski electrodes in FIG. 5, coaxial cylindrical electrodes in FIG. 6, round electrodes in FIG. 7, round electrode-plate electrode in FIG. 8, needle-needle electrodes in FIG. 9, needle-plate electrodes in FIG. 10 and wire-plate electrodes in FIG. 11. In FIG. 6, A denotes an external electrode, B denotes an internal electrode and C denotes an insulator.

Where vulcanized rubber articles are used as an object to be treated, the vulcanized rubber article is modified to provide its surface which is highly susceptible to adhesion. Accordingly, other member may be readily bonded to the modified surface of the rubber article by any known techniques such as mere heating, press bonding, thermal press bonding, drying in air and the like.

Other members may be made of organic and inorganic solids such as plastics, rubbers, metals, ceramics and the like. The member may take any forms such as plates, sheets, fibers, blocks and the like.

When the surface-treated rubber articles are bonded with other members, it is usual to use adhesives or bonding agents. Examples of the adhesive include silane coupling agents, aminosilane coupling agents, and epoxy, urethane, phenolic, acrylic and rubber adhesives. These are properly selected depending on the type and surface state of other member and the manner of bonding. Of course, depending on the type of member and the surface treating conditions of vulcanized rubbers, the member can be directly bonded to the rubber article without use of any adhesive or bonding agent.

The method of the invention is applicable to various types of materials and is particularly suitable for making vulcanized rubber composite materials. The method is favorably applied to fabrication of golf balls, rubber vibration insulators and regenerated tires.

Particularly, the surface treatment according to the present invention is preferably adopted as a pretreatment method for coating a golf ball, especially a thread-wound golf ball. Golf balls include not only thread-wound golf balls but also solid golf balls such as one-piece golf balls, two-piece golf balls and multi (three or more)-piece golf balls. The surface treatment according to the present invention is conducted to the covers composed of surlyn or balata of the golf balls, followed by coating. By surface treating the covers of the golf balls according to the present invention before coating, the coating layer has an excellent adhesion to the cover without removing even after hitting the golf ball many times. In case of one-piece golf balls, the surface treatment is directly conducted to the cores. The conventional coating compounds including epoxy resin type, polyurethane type and polyamide type are used for this purpose. The coating film may be clear or colored (for example, white).

The present invention is more particularly described by way of Examples, which should not be construed as limiting the invention thereto. Comparative Examples are also described.

EXAMPLES 1–13 & COMPARATIVE EXAMPLES 1–13

The surface treatment of vulcanized rubbers having the following rubber compositions was effected under conditions indicated in Table 1. The resultant samples were assessed according to the following test procedures 1 to 4 (Examples 1–13). For comparison, similar tests were effected on non-treated vulcanized rubber (Comparative Example 1), vulcanized rubber treated with a pseudo-halogen compound (Comparative Example 2), vulcanized rubbers subjected to low pressure plasma treated under conditions indicated in Table 1 (Comparative Examples 3–8), and vulcanized rubbers subjected to atmospheric pressure plasma treatment under conditions indicated in Table 1 (Comparative Examples 9–13). In all the Examples and Comparative Examples, the distance between the electrodes and an object to be treated was in the range of about 50 to 200 mm. The results are shown in Table 1.

| Experimental Test 1 | |
| --- | --- |
| | parts by weight |
| Trans-polyisoprene | 30 |
| SBR (1502 of Nippon Synthetic Rubber Co., Ltd.) | 50 |
| NR | 20 |
| Sulfur | 1 |
| Zinc oxide | 5 |
| Nocrac NS-6 (Ohuchi Sinko Chem. Co., Ltd.) | 1 |

Figure 12:
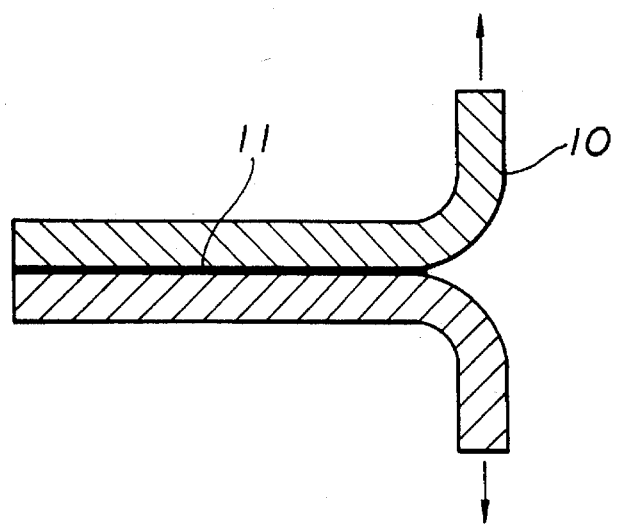
FIG. 12 is an illustrative view of a T-shaped peeling test used in Examples and Comparative Examples.

The rubber composition of the above formulation was vulcanized and used to make 10×60×3 mm test pieces. The surface treating apparatus shown in FIG. 1 was used wherein two test pieces obtained in each of the Examples and Comparative Examples were subjected to the surface treatment under conditions indicated in Table 1. Each piece was applied with a urethane adhesive at a predetermined portion of the treated surface thereof. The thus applied surfaces of the two test pieces were bonded together while leaving the test pieces to have a non-bonded free side. The bonded test pieces were subjected to a T-shaped peeling test in a manner as shown in FIG. 12 to measure an adhesion force. In FIG. 12, reference numeral 10 indicates a vulcanized rubber test piece and reference numeral 11 indicates a urethane adhesive. When the adhesion force was measured, the free ends of the test pieces 10 were pulled along the directions of arrows in FIG. 12.

Experimental Test 2

Figure 13:
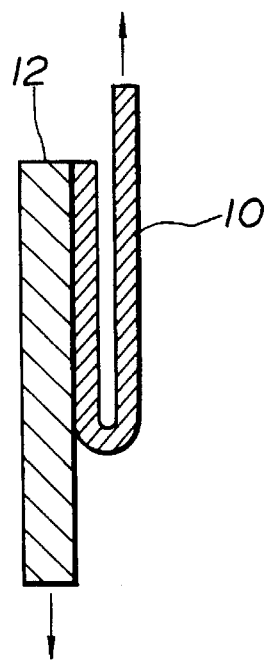
FIG. 13 is an illustrative view of a 180° peeling test used in Examples and Comparative Examples.

The surface treating apparatus of FIG. 2 was used wherein vulcanized test pieces as in Test 1 were subjected to surface treatment under conditions indicated in Table 1 (Examples 6 and 9 and Comparative Examples 1, 2, 9 and 10), followed by application of a urethane adhesive on each treated surface. The adhesive-bearing surface was bonded to a polyester non-woven fabric sheet and subjected to a 180° peeling test in a manner as shown in FIG. 13 wherein reference numeral 12 indicates a non-woven fabric sheet.

| Experimental Test 3 | |
| --- | --- |
| | parts by weight |
| SBR (1502 of Nippon Synthetic Rubber Co., Ltd.) | 50 |
| NR | 50 |
| Carbon black | 60 |
| Sulfur | 2 |
| Zinc oxide | 5 |
| Antioxidant (Note 1) | 1 |
| Vulcanizing accelerator (Note 2) | 1 |

(Note 1) N,N'-diphenyl-p-phenylenediamine (DPPD)
(Note 2) N-oxydiethylene-2-benzothiazole (NOBS)

The rubber composition of the above formulation was vulcanized and used to make 34×75×5 mm test pieces. The apparatus shown in FIG. 1 was used wherein two test pieces for each of Examples 1 to 4, 6 and 10 and Comparative Examples 1–10 were each subjected to surface treatment under conditions indicated in Table 1. The test pieces were applied with a phenolic adhesive at the treated surface thereof and were superposed so that the treated surfaces were facing each other, followed by press bonding under heating conditions of 150° C. and 30 minutes. The bonded pieces were subjected to the T-shaped peeling test shown in FIG. 12 in the same manner as in Experimental test 1, thereby measuring an adhesion force.

| Experimental Test 4 | |
| --- | --- |
| | parts by weight |
| NBR (N2305 of Nippon Synthetic Rubber Co., Ltd.) | 100 |
| Carbon black | 60 |
| Sulfur | 2 |
| Zinc oxide | 5 |
| Antioxidant (Note 3) | 1 |
| Vulcanizing accelerator (Note 4) | 1 |
| Mineral oil | 30 |

(Note 3) N-phenyl-N'-isopropyl-p-phenylenediamine (NOCRAC 810-NA)
(Note 4) Tetramethylthiuram monosulfide (TMTM)

The rubber composition of the above formulation was vulcanized at 150° C. for 20 minutes, followed by making 34×75×5 mm test pieces. The apparatus shown in FIG. 1 was used wherein the test pieces were each subjected to surface treatment under conditions indicated in Table 1 (Examples 11–13 and Comparative Examples 11–13). Thereafter, the treated surface of each piece was applied with a phenolic adhesive and thermally treated in an oven at a temperature of 150° C. for 30 minutes. Thereafter, a resin injection machine was used to have a glass fiber-filled nylon (with a filling rate of 50%) injection molded on the phenolic resin adhesive layer, followed by a 180° peeling test in a manner as shown in FIG. 13 to measure a rubber breakage in terms of an area by percent of the breakage.

TABLE 1

| No. | Type of surface treatment | Pressure (Torr) | Reactant gas | Diluent gas | Treating time (min.) | Bonding force (kgf/cm) Test 1 | Test 2 | Test 3 | Rubber breakage (area by %) Test 4 |
|---|---|---|---|---|---|---|---|---|---|
| Example | | | | | | | | | |
| 1 | corona | 760 | $CHClF_2$ | air | 0.5 | 6.8 | — | 8.1 | — |
| 2 | discharge | 760 | $CHClF_2$ | air | 1 | 7.0 | — | 8.6 | — |
| 3 | treatment | 760 | $CHClF_2$ | air | 2 | 7.6 | — | 8.9 | — |
| 4 | | 760 | $CHClF_2$ | air | 5 | 10.8 | — | 11.7 | — |
| 5 | | 760 | $CHClF_2$ | air | 5 | 6.7 | — | — | — |
| 6 | | 760 | $O_2$, $CHClF_2$ | $N_2$ | 5 | 9.2 | 8.4 | 12.4 | — |
| 7 | | 760 | $O_2$, $CHClF_2$ | — | 5 | 8.9 | — | — | — |
| 8 | | 760 | $O_2$, $CF_4$, $CCl_4$ | — | 5 | 9.6 | — | — | — |
| 9 | | 760 | $O_2$, $CF_4$, $CH_2Cl_2$ | — | 5 | 9.4 | — | — | — |
| 10 | | 760 | $CBrF_3$ | air | 5 | 9.8 | 8.2 | 12.7 | — |
| 11 | | 760 | $CF_4$ | air | 0.2 | — | — | — | 80 |
| 12 | | 760 | $CF_4$ | air | 0.5 | — | — | — | 100 |
| 13 | | 760 | $CF_4$ | air | 1 | — | — | — | 100 |
| Comparative Example | | | | | | | | | |
| 1 | non-treated | — | — | — | — | 0.0 | 0.0 | 0.0 | — |
| 2 | treatment with psuedo-halogen compound | — | — | — | — | 7.8 | 6.4 | 9.1 | — |
| 3 | low | 1.0 | $CHClF_2$ | air | 0.5 | 0.1 | — | 0.1 | — |
| 4 | pressure | 1.0 | $CHClF_2$ | air | 1 | 0.2 | — | 0.1 | — |
| 5 | plasma | 1.0 | $CHClF_2$ | air | 2 | 0.2 | — | 0.2 | — |
| 6 | treatment | 1.0 | $CHClF_2$ | air | 5 | 0.2 | — | 0.1 | — |
| 7 | | 1.0 | $O_2$, $CHClF_2$ | $N_2$ | 5 | 0.4 | — | 0.6 | — |
| 8 | | 1.0 | $O_2$, $CHClF_2$ | — | 5 | 0.6 | — | 1.0 | — |
| 9 | atmospheric | 760 | $O_2$, $CHClF_2$ | He | 5 | 8.0 | 7.2 | 10.9 | — |
| 10 | pressure | 760 | $O_2$, $CBrF_3$ | He | 5 | 8.6 | 6.1 | 9.4 | — |
| 11 | plasma | 760 | $O_2$, $CF_4$ | He | 0.2 | — | — | — | 40 |
| 12 | treatment | 760 | $O_2$, $CF_4$ | He | 0.5 | — | — | — | 100 |
| 13 | | 760 | $O_2$, $CF_4$ | He | 1 | — | — | — | 100 |

In Example 5, the sample was placed between the electrodes.

As will be apparent from the results of Table 1, with the low pressure glow plasma treatment (Comparative Examples 3–8), the adhesion force becomes very poor. With the corona discharge treatment (Examples 1–13), the adhesion force and the rubber breakage are equal to or better than that of the atmospheric pressure plasma treatment (Comparative Examples 9–13). Since expensive helium gas is not necessary for use as a diluent gas, good adhesive surfaces can be inexpensively formed.

EXAMPLES 14–25

A vulcanized rubber in the form of a ball having a diameter of 40 mm was obtained by vulcanizing a rubber composition which had the same formulation as in Experimental Test 1. The rubber sphere was subjected to surface treatment according to the following procedure, followed by bonding the resultant ball with a non-woven fabric sheet by means of a urethane adhesive and curing. The peeling force (adhesion force) of the non-woven fabric sheet was measured. The results are shown in Table 2.

Surface Treatment Procedure

Figure 14:
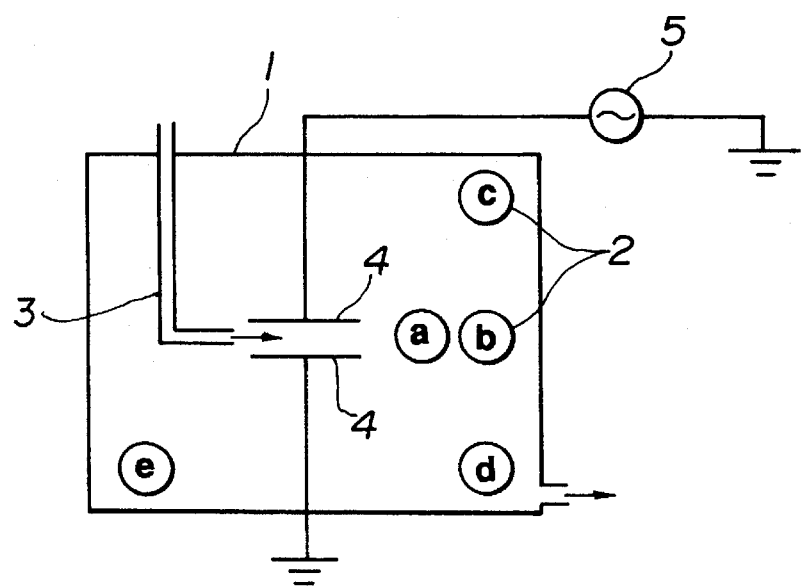
FIG. 14 is a schematic view illustrating a device used in a test of the invention.

A discharge apparatus shown in FIG. 14 was used, which had a plastic container as a treating chamber with an outside dimension of 300×300×300 mm and a pair of parallel plate electrodes each having a size of 70×150 mm. A plurality of objects to be treated were, respectively, placed at positions a, b, c, d and e of FIG. 14. The positions a, b, c, d and e in the figure were, respectively, determined as follows.

Position a is just beside the electrodes at a distance of 40 mm from the end of the electrodes to the center of the object to be treated.

Position b is just beside the electrodes at a distance of 100 mm from the end of the electrodes to the center of the object to be treated.

Position c is just above the Position b at a distance of 100 mm from the end of the upper electrode to the center of the object to be treated.

Position d is just below the Position b at a distance of 100 mm from the end of the lower electrode to the center of the object to be treated.

Position e is symmetrical to Position d with respect to the electrodes.

Then, the mixed gases of reactant gases and diluent gases indicated in Table 2 were, respectively, introduced into the chamber for the surface treatment.

TABLE 2

| Example No. | Position of object to be treated | Distance between electrodes (mm) | Frequency (kHz) | Applied voltage (kV) | Reactant gas | Diluent gas Kind | Diluent gas Flow rate (l/min.) | Treating time (min.) | Adhesion force (kgf/cm)* |
|---|---|---|---|---|---|---|---|---|---|
| 14 | a, b, c, d, e | 2 | 0.05 | 20 | air | — | — | 5 | 3.9 |
| 15 | a, b, c, d, e | 2 | 1 | 15 | air | — | — | 5 | 3.8 |
| 16 | a, b, c, d, e | 2 | 20 | 10 | air | — | — | 5 | 4.2 |
| 17 | a, b, c, d, e | 2 | 0.05 | 20 | $CHClF_2$ | air | 3 | 5 | 5.6 |
| 18 | a, b, c, d, e | 2 | 1 | 15 | $CHClF_2$ | air | 3 | 5 | 6.3 |
| 19 | a, b, c, d, e | 2 | 20 | 10 | $CHClF_2$ | air | 3 | 5 | 6.7 |
| 20 | a, b, c, d, e | 2 | 0.05 | 20 | $CBrF_3$ | air | 3 | 5 | 6.6 |
| 21 | a, b, c, d, e | 2 | 1 | 15 | $CBrF_3$ | air | 3 | 5 | 6.5 |
| 22 | a, b, c, d, e | 2 | 20 | 10 | $CBrF_3$ | air | 3 | 5 | 6.8 |
| 23 | a, b, c, d, e | 2 | 20 | 10 | $CHClF_2$ | — | — | 5 | 6.6 |
| 24 | a, b, c, d, e | 2 | 20 | 10 | $O_2$ | — | — | 5 | 2.9 |
| 25 | a, b, c, d, e | 2 | 20 | 10 | $O_2$ | — | — | 5 | 2.6 |

*The adhesion force is an average value of the measurements of the objects located at Positions a to e.

From the results of Table 2, it will be seen that when the objects to be treated are located as separated from the discharge unit without placing the object between the electrodes, the surface treatment proceeds satisfactorily.

EXAMPLES 26–33

The general procedure of Examples 14–25 was repeated except that there were used the apparatus shown in FIG. 2 for Examples 26–29 and the apparatus shown in FIG. 3 for Examples 30–33 and that the distance between the object to be treated and the electrodes was about 200 mm, thereby obtaining surface-treated objects. These objects were subjected to measurements in a manner similar to the foregoing Examples. The results are shown in Table 3.

EXAMPLES 34–37

Vulcanized rubber pieces (34×75×5 mm) obtained by vulcanizing a rubber composition with the same formulation as in Experimental Test 3 were subjected to surface treatment using the apparatus of FIG. 1 under conditions indicated in Table 4. The adhesion force of the thus treated vulcanized rubber pieces was assessed according to the following procedure. The results are shown in Table 4.

Surface Treating Procedure

Two pieces for each example were surface treated and applied with a phenolic adhesive on the respective treated surfaces. The applied surfaces were superposed and press

TABLE 3

| Example No. | Distance between electrodes (mm) | Frequency (kHz) | Applied voltage (kV) | Reactant gas | Diluent gas Kind | Diluent gas Flow rate (l/min.) | Treating time (min.) | Adhesion force (kgf/cm) |
|---|---|---|---|---|---|---|---|---|
| 26 | 2 | 20 | 10 | $CHClF_2$ | air | 3 | 5 | 6.8 |
| 27 | 2 | 20 | 10 | $O_2$ | — | — | 5 | 3.1 |
| 28 | 2 | 20 | 10 | $O_2$ + $CHClF_2$ | — | — | 5 | 6.1 |
| 29 | 2 | 20 | 10 | $N_2$ | — | — | 5 | 2.4 |
| 30 | 2 | 20 | 10 | $CHClF_2$ | air | 3 | 5 | 7.0 |
| 31 | 2 | 20 | 10 | $O_2$ | — | — | 5 | 3.2 |
| 32 | 2 | 20 | 10 | $O_2$ + $CHClF_2$ | — | — | 5 | 6.7 |
| 33 | 2 | 20 | 10 | $N_2$ | — | — | 5 | 3.0 |

From the results of Table 3, it will be seen that good results of the surface treatment are obtained when the discharge chamber and the treating chamber are separated from each other.

bonded under heating conditions of 150° C. for 30 minutes, followed by a T-shaped peeling test shown in FIG. 12 to measure the adhesion force.

TABLE 4

| Example No. | Position of object to be treated | Distance between electrodes (mm) | Frequency (kHz) | Applied voltage (kV) | Reactant gas | Diluent gas Kind | Flow rate (l/min.) | Treating time (min.) | Adhesion force (kgf/cm) |
|---|---|---|---|---|---|---|---|---|---|
| 34 | Position separated from the electrodes | 2 | 20 | 10 | $CHClF_2$ | air | 3 | 5 | 9.8 |
| 35 | Position separated from the electrodes | 2 | 20 | 10 | $CBrF_3$ | air | 3 | 5 | 11.0 |
| 36 | Between electrodes | 7 | 20 | 10 | — | air | 3 | 5 | 3.0 |
| 37 | Between electrodes | 7 | 20 | 10 | $CHClF_2$ | air | 3 | 5 | 6.3 |

EXAMPLES 38–40

A rubber composition of the same formulation as used in Experimental Test 4 was vulcanized under the same conditions as in Test 4 using the apparatus shown in Table 14, from which similar test pieces were made and subjected to surface treatment and measurement in the same manner as in Test 4. The results are shown in Table 5.

TABLE 5

| Example No. | Position of object to be treated | Distance between electrodes (mm) | Frequency (kHz) | Applied voltage (kV) | Reactant gas | Diluent gas Kind | Flow rate (l/min.) | Treating time (min.) | Rubber breaking force (area by %) |
|---|---|---|---|---|---|---|---|---|---|
| 38 | a, b, c, d, e | 2 | 20 | 10 | $CHClF_2$ | air | 3 | 5 | 100 |
| 39 | a, b, c, d, e | 2 | 20 | 10 | $CBrF_3$ | air | 3 | 5 | 100 |
| 40 | a, b, c, d, e | 2 | 20 | 10 | $O_2$ + $CHClF_2$ | — | — | 5 | 100 |

EXAMPLES 41–44

Polyethylene terephthalate (O-PET), polytetrafluoroethylene (Teflon of Du Pon de Nemours), ETFE (an ethylene-tetrafluoroethylene copolymer), 6,6-nylon, stainless steel (SUS), aluminum and brass which were each in the form of a sheet or plate were subjected to surface treatment under the same conditions as in Example 6. Each sample was subjected to measurement of an angle of contact of water droplets prior to and after the surface treatment.

TABLE 6

| Example No. | Object to be treated | Angle of contact with water droplet (degree) before corona discharge | after corona discharge |
|---|---|---|---|
| 41 | O-PET | 82 | 41 |
| 42 | Teflon | 112 | 62 |
| 43 | ETFE | 98 | 65 |
| 44 | 6,6-nylon | 67 | 25 |
| 45 | SUS | 58 | 11 |
| 46 | Aluminum | 57 | 7 |
| 47 | Brass | 66 | 9 |

From the results of Table 6, it will be seen that the wettability of the treated surfaces of the materials is improved. Thus, the surfaces are suitable for making composite materials used in combination with other materials.

EXAMPLE 48

Vulcanized rubber balls with a diameter of 42 mm which were, respectively, obtained by vulcanizing a rubber composition of the formulation as used in Experimental Test 1 were, respectively, located at positions a, b, c, d and e of the apparatus shown in FIG. 14, followed by surface treatment under conditions of Examples 17–19. After the surface treatment, a urethane paint was applied onto the treated surface of each ball and dried well. The balls were each subjected to a durability test by hitting (200 hits) with a golf club, revealing that the paint film did not come off and was not damaged.

EXAMPLE 49

A cover composition having the following formulation was covered to a thread-wound golf ball core and then vulcanized to form a cover.

| Cover Composition | parts by weight |
|---|---|
| Trans-isoprene | 70 |
| SBR (styrene rich) | 20 |
| NR | 10 |
| Sulfur | 1 |
| Zinc oxide | 5 |
| Titanium oxide | 5 |
| Stearic acid | 5 |

To the above cover composition, barium oxide was blended so that the cover had a specific gravity was 1.12.

The resulting golf ball was subjected to surface treatment by using the apparatus shown in FIG. 2 and the electrodes shown in FIG. 6.

Electrode (FIG. 6)

Internal electrode to which a voltage is applied was made of stainless steel and had a diameter of 18 mm.

Insulator in the form of a cylinder was made of alumina and had an external diameter of 28 mm, a thickness of 2 mm and a length of 300 mm.

External electrode which is grounded was formed by coating silver paste on the external surface of the cylindrical insulator.

A heat dissipation plate was mounted to the external electrode and the electrodes were air cooled by an AC axial flow fan.

Surface Treatment Conditions

Reactant gas: Air 10 l/min. +$CHClF_2$ 30 ml/min.

Frequency: 20 kHz

Electric power: 700 W

The gas produced by the corona discharge in the above conditions was led to the reacting chamber through a polytetrafluoroethylene tube. The distance between the electrodes and the chamber was 1 m. In the chamber, 100 golf balls were provided and treated with the gas for 1 minute.

The treated golf balls were subjected to coating with a white color polyurethane coating compound, drying and baking, and thereafter coating with a clear coating compound, drying and baking.

For comparison, untreated golf balls were subjected to the same white and clear coating processes as above.

To the samples (each 10 golf balls for the invention and comparison), a crosshatch test was conducted by crosscutting the coating film by a knife, contact bonding an adhesive tape to the cross-cut surface and rapidly removing the adhesive tape. The evaluation was made by whether or not the coating film was removed by attached to the adhesive tape at the predetermined six positions. As the results, in the tested 10 invention golf balls, the coating films were not removed. On the other hand, in the tested 10 comparison golf balls, the coating films were removed at 59 positions in total (10 golf balls×6 positions).

Further, a hitting test was also conducted to the samples (each 10 golf balls for the invention and comparison) by repetitively hitting the golf balls at a head speed of 45 m/sec. to evaluate whether or not the coating film was removed. As the result, the coating films of the invention golf balls were not removed even after 200 hittings. On the other hand, the coating films of the comparison golf balls were removed after 5 hittings.

As is evident from the above results, the coating films of the invention golf balls which were surface treated according to the present method was strongly adhered to the covers of the golf balls. Therefore, it was recognized that the surface treatment method of the present invention can give an excellent adhesion of a coating film to a golf ball.

As will be apparent from the foregoing, according to the method of the invention, there can be obtained adhesive surfaces of materials and particularly vulcanized rubbers which are better than those obtained, for example, by low pressure plasma treatments and are equal to the surfaces attained by atmospheric pressure plasma processes. Nevertheless, expensive diluent gases such as helium as will be required in the atmospheric pressure plasma processes are not used at all in the method of the invention. In addition, the method of the invention is carried out using existing, inexpensive, general-purpose corona units and ensures the treatment of only a surface skin layer, thus not impeding physical properties of materials to be treated.

What is claimed is:

1. A surface treating method comprising the steps of: applying between electrodes, a potential sufficient to cause corona discharge to occur at an absolute pressure of 300 to 4000 Torr in the presence of a gas which comprises molecules containing at least one atom selected from the group consisting of halogen atom, oxygen atom and nitrogen atom; and subjecting an object to surface treatment with the resulting gas generated by the discharge, said object being outside said electrodes and separated from said electrodes at a distance in the range of 10 mm to 5 m.

2. A surface treating method according to claim 1, wherein said gas consists essentially of said molecules.

3. A surface treating method according to claim 2, wherein said gas consists essentially of molecules containing nitrogen atom.

4. A surface treating method according to claim 3, wherein said gas consists essentially of $N_2$ molecules.

5. A surface treating method according to claim 2, wherein said gas consists essentially of molecules containing oxygen atom.

6. A surface treating method according to claim 5, wherein said gas consists essentially of $O_2$ molecules.

7. A surface treating method according to claim 6, wherein said gas consists essentially of air.

8. A surface treating method according to claim 2, wherein said gas consists essentially of molecules containing halogen atom.

9. A surface treating method according to claim 8, wherein said gas consists essentially of a halogenated hydrocarbon.

10. A surface treating method according to claim 8, wherein said gas consists essentially of a flon.

11. A surface treating method according to claim 8, wherein said gas consists essentially of a halon.

12. A surface treating method according to claim 1, wherein said gas comprises said molecules and a diluent gas.

13. A surface treating method according to claim 12, wherein said diluent gas consists essentially of nitrogen gas.

14. A surface treating method according to claim 12, wherein said diluent gas consists of air.

15. A surface treating method according to claim 1, wherein said object is made of a vulcanized rubber.

16. A surface treating method according to claim 1, wherein said object is in the form of a golf ball prior to painting.

17. A surface treating method according to claim 1, wherein at least one of the electrodes is covered with an insulator.

18. A surface treating method according to claim 17, wherein both electrodes are covered with an insulator.

19. A surface treating method according to claim 1, wherein said object is separated from said electrodes by a distance in the range from 10 mm to 2 m.

20. A surface treating method according to claim 1, wherein said potential is applied to said electrodes at an absolute pressure of 700 to 1000 Torr.

21. A surface treating method according to claim 20, wherein said potential is applied to said electrodes at an absolute pressure of 740 to 800 Torr.

* * * * *